Oct. 20, 1936.  E. F. JACOBS  2,057,779
GASOLINE PURIFYING MEANS
Original Filed Nov. 28, 1933
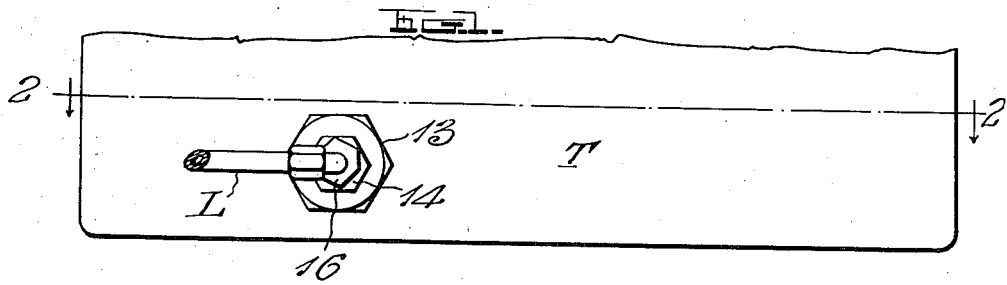
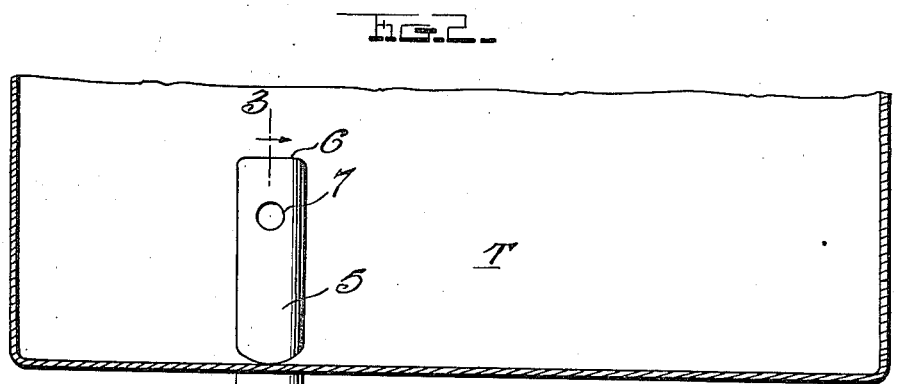
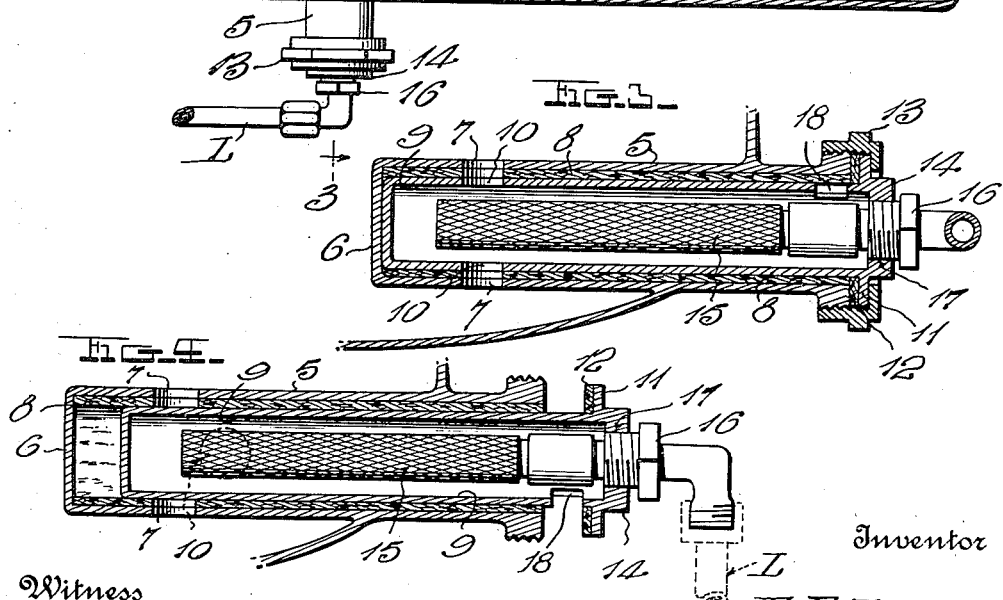
Witness
H. Woodard
Inventor
E. F. Jacobs
By H. B. Willson & Co.
Attorneys.

Patented Oct. 20, 1936

2,057,779

UNITED STATES PATENT OFFICE 2,057,779

GASOLINE PURIFYING MEANS

Edwin F. Jacobs, Toronto, Ohio

Original application November 28, 1933, Serial No. 700,138. Divided and this application September 21, 1935, Serial No. 41,616

2 Claims. (Cl. 210—166)

This application is a division of my parent U. S. application Serial No. 700,138, filed November 28, 1933.

It is the object of the invention to provide new and advantageous means for removing water, rust accumulation and other foreign matter from gasoline used for the propulsion of automobiles, motorboats, aircraft, etc., obviating troubles now commonly encountered with gasoline which is dirty or contains water.

With the foregoing in view, the invention resides in the novel subject matter hereinafter described and claimed, description being accomplished by reference to the accompanying drawing.

Fig. 1 is a side elevation of a portion of a fuel tank provided with the invention.

Fig. 2 is a horizontal sectional view on line 2—2 of Fig. 1.

Fig. 3 is a vertical sectional view on line 3—3 of Fig. 2.

Fig. 4 is a view similar to Fig. 3 but showing certain parts moved to different positions.

In the drawing above briefly described, T denotes a conventional fuel tank and L has reference to a fuel line for conducting the fuel from said tank to the carbureter.

Extending into the tank T, near its bottom, is a fixed horizontal tube 5 having an open outer end and a closed inner end 6, said tube having openings 7 for placing it in communication with the tank T. This tube 5 is provided with a lining 8 of cork or the like, and within this lining, a valve tube 9 is snugly, yet rotatably fitted, said valve tube having openings 10 for registration with the openings 7. The valve tube 9 is provided at its outer end with a peripheral flange 11 having a gasket 12 which abuts the outer end of the tube 5, and a ring nut 13 which is threaded on said tube 5, abuts said flange 11 to normally hold the valve tube 9 in proper position. The outer end of this valve tube is provided with a head 14 for engagement with a wrench or the like so that it may be rotated to bring its openings 10 out of registration with the openings 7, whenever desired, after first loosening the nut 13.

A tubular strainer 15 for the gas line L is carried by a plug 16, this plug being connected with said gas line and being threaded into an opening 17 in the outer end of the valve tube 9, said strainer being of less diameter than said plug. When the valve tube 9 is turned to cut off communication between its openings 10 and the openings 7, the gas line L may be disconnected and the plug 16 and strainer 15 removed, allowing cleaning of said strainer. By outwardly pulling the valve tube 9 as seen in Fig. 4 after turning said valve tube to close the openings 7 and 9, an opening 18 with which said tube is provided, is exposed for drainage purposes, allowing any accumulation to be drained from the tube.

By providing the improved structure herein described, effective insurance is attained against carburetion troubles.

I claim:—

1. A device of the class described comprising a fixed tube having an opening for communication with a tank, said fixed tube having an open outer end, a valve tube rotatably received in said fixed tube and having an opening normally registering with the opening of said fixed tube, at least one of said tubes having a closed inner end, said valve tube projecting beyond said fixed tube and having means on its projecting end whereby it may be rotated to move its opening out of register with that of said fixed tube, and a tubular strainer within said valve tube and removable therefrom through its outer end, said valve tube having a drain opening normally closed by said fixed tube but exposable by outward sliding of said valve tube.

2. A device of the class described comprising a fixed tube passing through the wall of a liquid tank, said fixed tube having an opening communicating with the tank and being provided with an open externally threaded outer end projecting outwardly from the tank, a valve tube snugly received in said fixed tube and having an opening normally registering with the aforesaid opening, at least one of said tubes having a closed inner end, said valve tube being provided with a peripheral flange in opposed relation with the outer end face of said fixed tube, a gasket between said flange and end face, a ring nut abutting the outer side of said flange and threaded on said threaded outer end of said fixed tube to hold said valve tube until said ring nut is loosened, said valve tube being provided with an outer end wall having an opening and being also provided with wrench-engaging means for rotating said valve tube to closed position when said ring nut is loosened, a removable plug threaded through said opening of said outer end wall of said valve tube, a tubular strainer within said valve tube, said strainer being secured to the inner end of said plug and being of less diameter than the same to be removable bodily therewith, and a liquid discharge line for the tank detachably connected with the outer end of said plug and communicating with the interior of said strainer.

EDWIN F. JACOBS.